March 3, 1959 W. W. PHARIS 2,876,300

TELEPHONE TEST SELECTOR

Filed Aug. 23, 1956 9 Sheets-Sheet 1

INVENTOR.
WILLIAM W. PHARIS

BY Henry H. Gage
AGENT

March 3, 1959 W. W. PHARIS 2,876,300

TELEPHONE TEST SELECTOR

Filed Aug. 23, 1956 9 Sheets-Sheet 4

March 3, 1959 W. W. PHARIS 2,876,300

TELEPHONE TEST SELECTOR

Filed Aug. 23, 1956 9 Sheets-Sheet 7

2,876,300

TELEPHONE TEST SELECTOR

William W. Pharis, Rochester, N. Y., assignor to General Dynamics Corporation, Rochester, N. Y., a corporation of Delaware Application August 23, 1956, Serial No. 605,907

6 Claims. (Cl. 179—175.2)

My invention relates to telephone systems in general and more particularly to selectors for use in telephone systems.

In telephone offices including both terminal-per-station and terminal-per-line type switching equipment of the well-known type to be operated on a uniform numbering basis and where a single test switch train is to be used for establishing special test or monitoring connections to subscribers' lines within the offices, it has been necessary to direct the switch train by signals different from the directory number of the line to be tested. Thus, in such systems, it is necessary to instruct the operator who controls the establishment of such test connections to omit the final (ringing code selection) digit in establishing connections to terminal-per-line lines, and to omit the first or intermediate canceled digits in terminal-per-station type directory number during the course of establishing connections to terminal-per-station lines. Such procedure is objectionable for many reasons, including the requirement of additional skill on the part of operators and the increased possibility of error in establishing test connections. In order to overcome these and other objections, discriminating selector circuits using single motion switches, such as the one shown and described in the application of William W. Pharis entitled "Telephone Test Selector," Serial No. 580,039, filed on and assigned to the same assignee as the present application, have been made. In such single motion selectors it is necessary to employ a drop-back technique. The capacity of the selector is limited to the number of points accessible in response to the transmission of the impulses of a single digit.

It is an object of my invention to provide a new and improved selector for use in a telephone system.

Another object of my invention is to provide a new and improved selector utilizing a two-motion switch and which is readily capable of establishing connections between a calling station and either terminal-per-line or terminal-per-station type lines.

Another object of my invention is to provide a two-motion selector capable of establishing connections between a calling station and either terminal-per-station or terminal-per-line type lines on a uniform numbering basis without resorting to the use of drop-back selector operation.

Another object of my invention is to provide a two-motion selector adaptable for use in a test switch train and capable of establishing connections between a calling station and terminal-per-station and terminal-per-line equipment on a uniform numbering basis.

I achieve these and other objects in a selector including a switch having a set of wipers and a plurality of terminals arranged in various levels to be engaged by the wiper set. Succeeding apparatus including connectors and/or other selectors are terminated on certain ones of the terminal sets. Within the selector I provide means for advancing the wiper set from its normal position in a primary direction in order to select any one of the levels. Following the selection of one of the levels, other means within the selector is effective for advancing the wiper set in a secondary direction in order to select one of the terminal sets within the selected level on which succeeding apparatus is terminated.

When used as a test selector, a calling station, such as a wire chief's telephone, is provided for seizing and thereafter transmitting directive signals composed of trains of digit impulses to means within the selector for repeating such signals. The repeating means is effective for directively operating the primary advancing means. Thereafter the secondary advancing means is operated in order to advance the wiper set into engagement with one of the terminal sets. Following the selection of any one of the terminal sets, the repeating means is made effective for repeating subsequently transmitted groups of digit signal impulses to the succeeding apparatus terminated on the selected terminal set.

According to the invention, counting means within the selector is operative for counting the number of groups of digit impulses by counting the digit operations of the repeating means and is further operative upon a registration of a predetermined number of such groups of digit impulses for rendering the repeating means ineffective. Means associated with the selector switch such as secondary off-normal springs is operative in response to the advance of the wiper set in its secondary direction for rendering the counting means operative, so that only a predetermined number of groups of digit signal impulses transmitted to the selector repeating means after the selection of a terminal set are repeated to the apparatus connected to the selected terminal set. Thus in the case of connections extended through the selector to terminal-per-line type connectors the counting means may be arranged in such a manner that the repeating means is rendered ineffective to transmit the impulses representing the final, ringing selection signal to the connector.

Further objects and advantages of my invention will become apparent as the following description proceeds. The points of novelty which characterize my invention are set forth with particularity in the claims annexed to and forming a part of this description. For a better understanding of the description, reference may be had to the following drawings, in which:

Figs. 3–10 show a selector; and ,

Fig. 11 shows the order in which Figs. 2–10 are to be arranged.

Figure 2A:
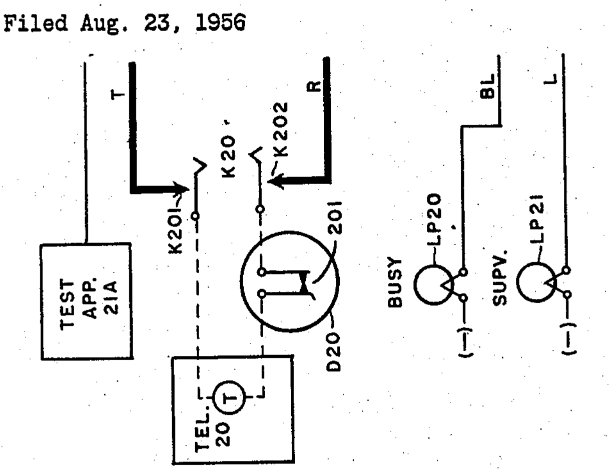
Figs. 2A and 2B are a wire chief position and a selector respectively which have access to the selector shown in Figs. 3–10.

In the following description, the first digit of the numerical designation of each relay or relay contact described will have the same numerical value as the figure number of the drawing in which such relay or contact is shown. Therefore, the specific reference to various figures in the drawing will be made only when required for special reasons when describing relay components.

The apparatus referred to in the following description is made to function from power supplied from a source such as a battery. The most positive terminal or plate of the battery is connected to ground and is referred to hereafter as "ground" in the description and as (+) in the drawings. The most negative, ungrounded terminal or plate of the battery is referred to as "battery" in the description and as (—) in the drawings.

*Extension of the call to the test selector*

Figure 1:
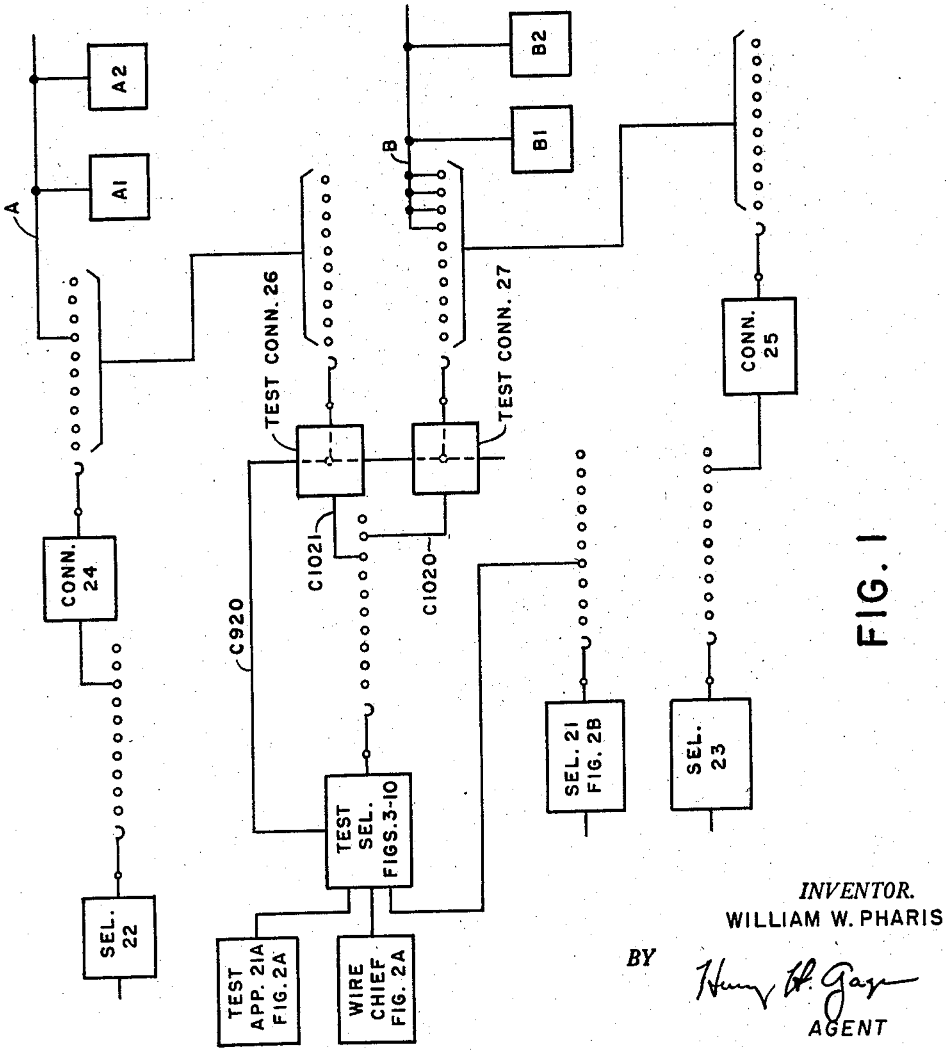
Fig. 1 shows a block diagram of a typical system in which a selector using the preferred embodiment of my invention may be incorporated.
Figure 3:
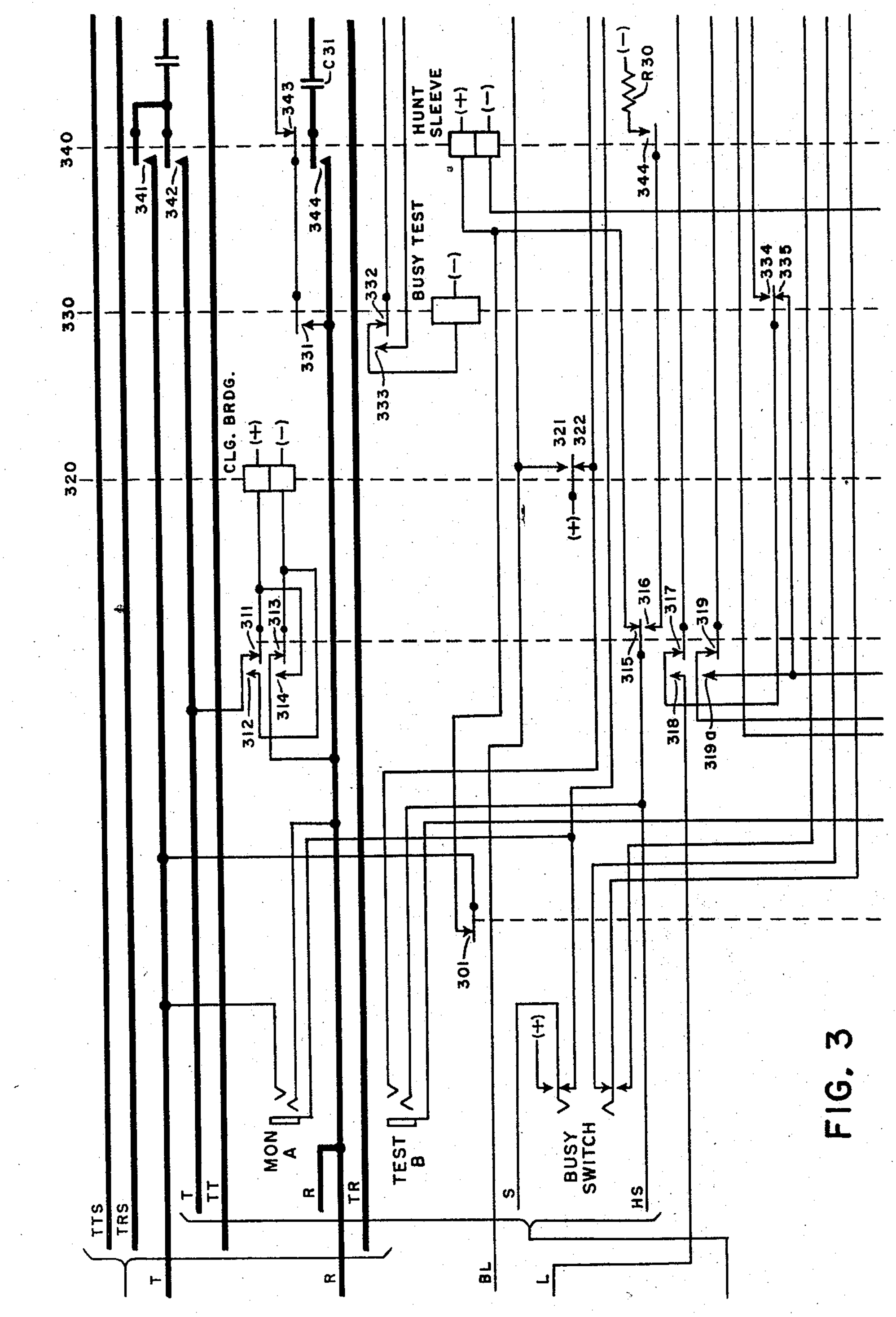
Figures 4, 11:
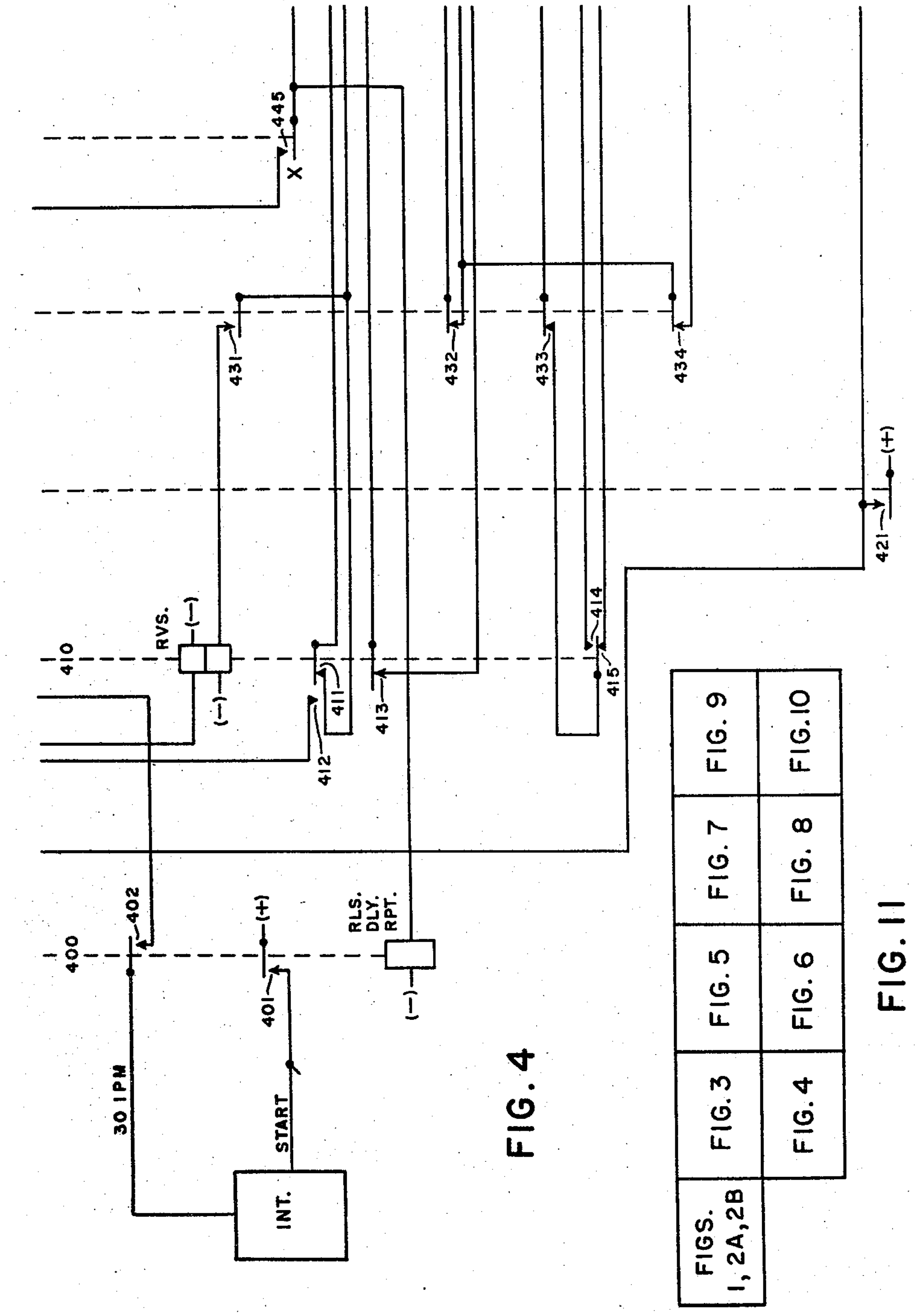
Figure 5:
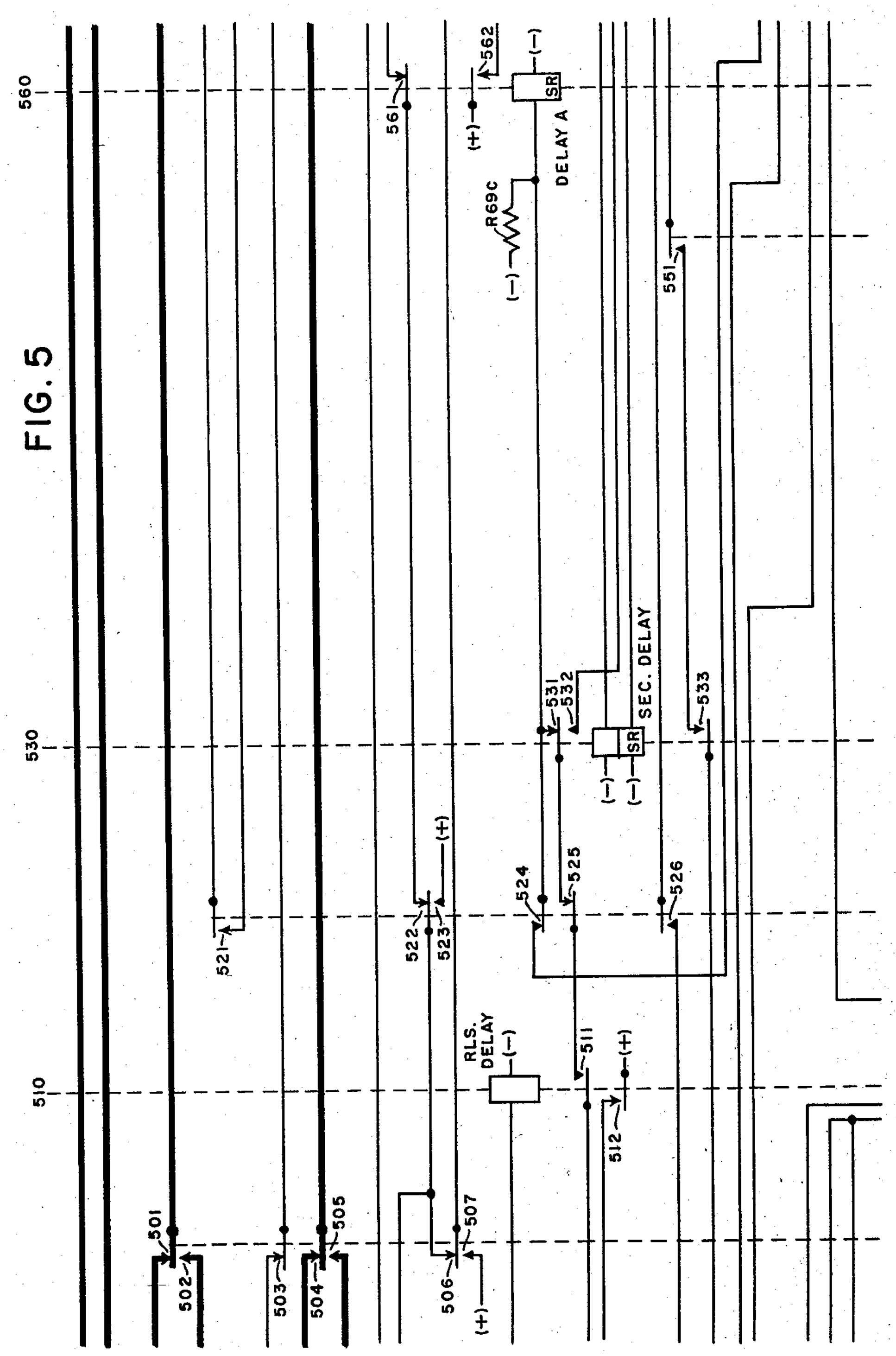
Figure 6:
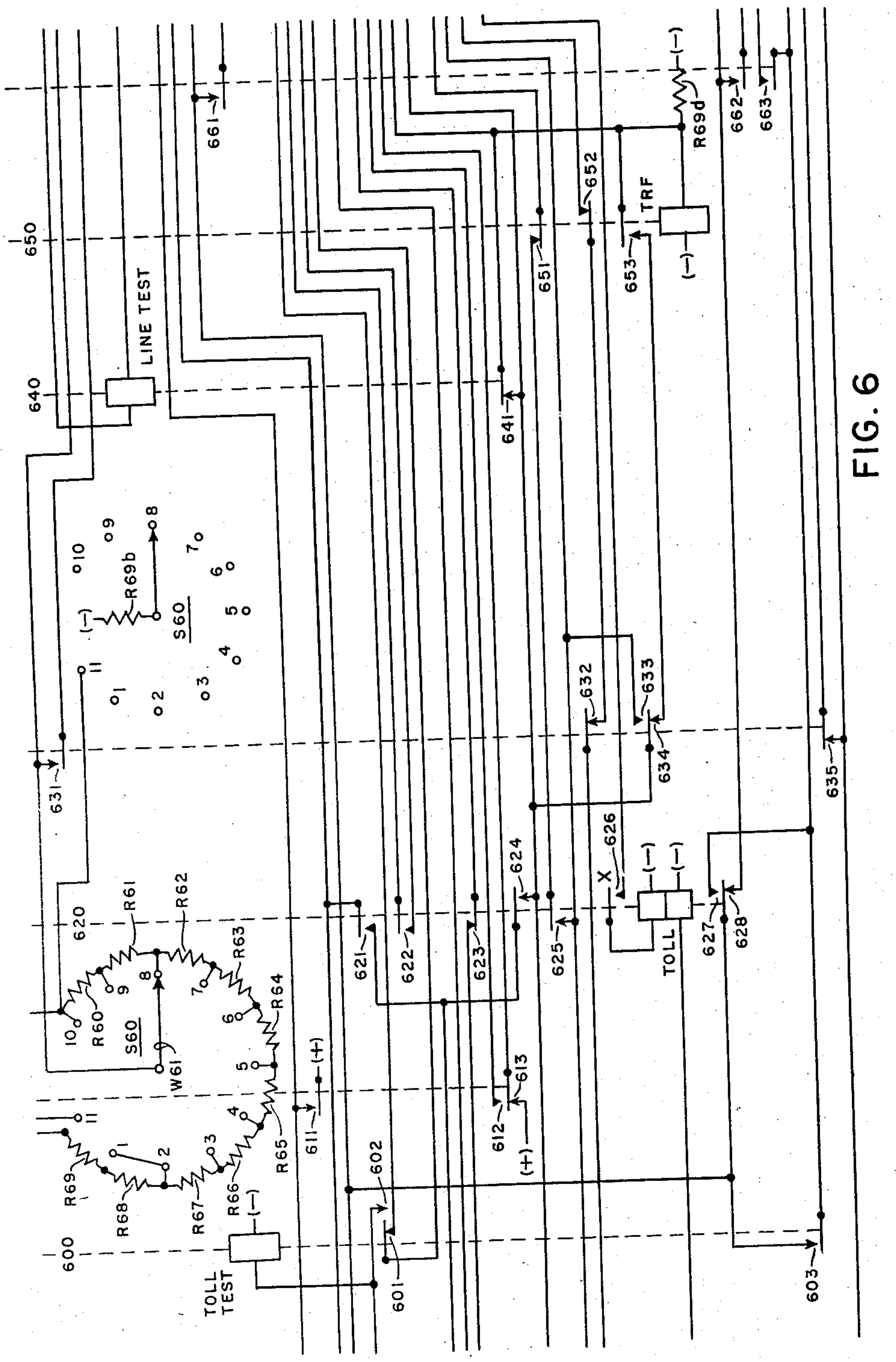
Figure 7:
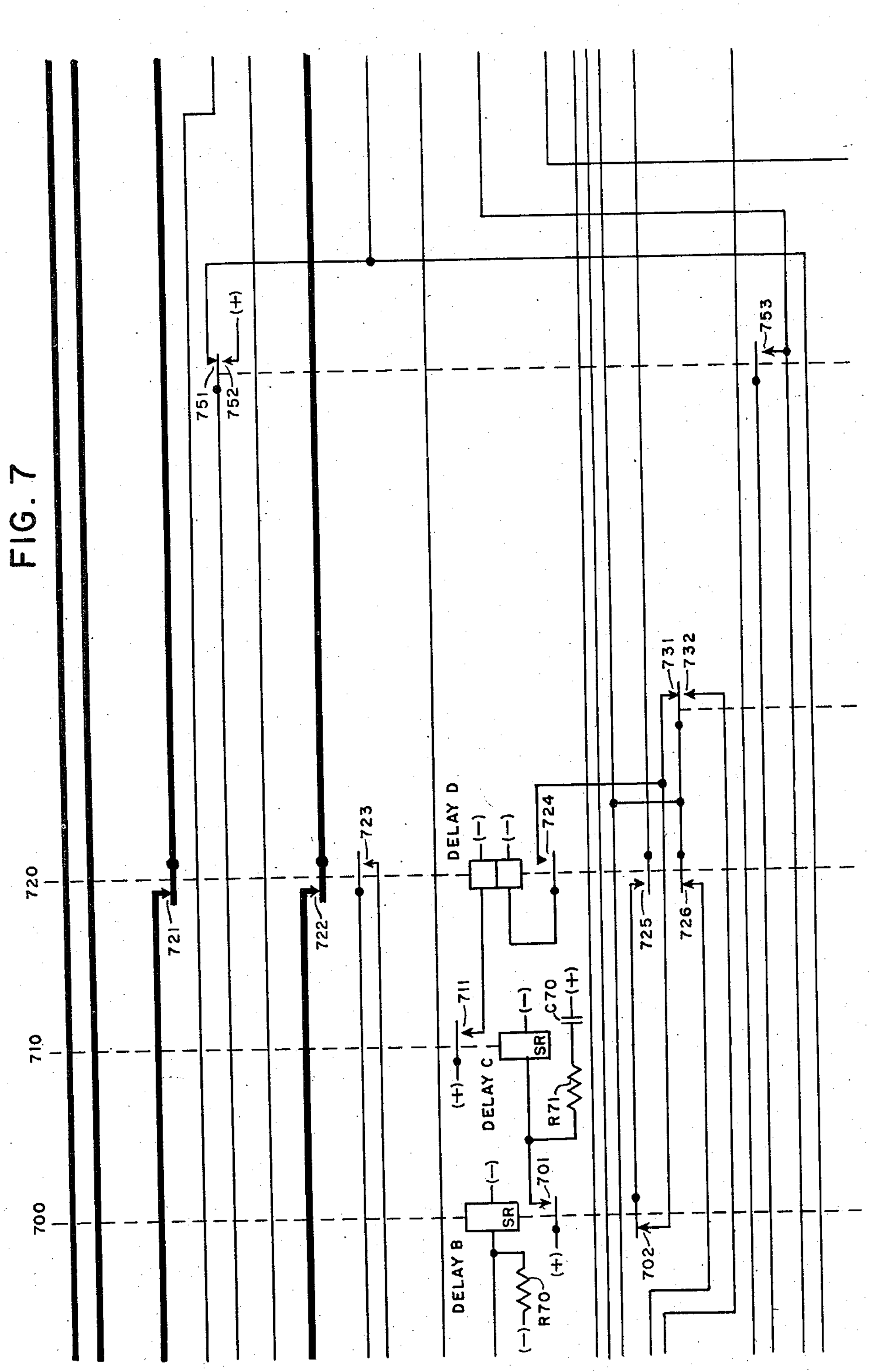
Figure 8:
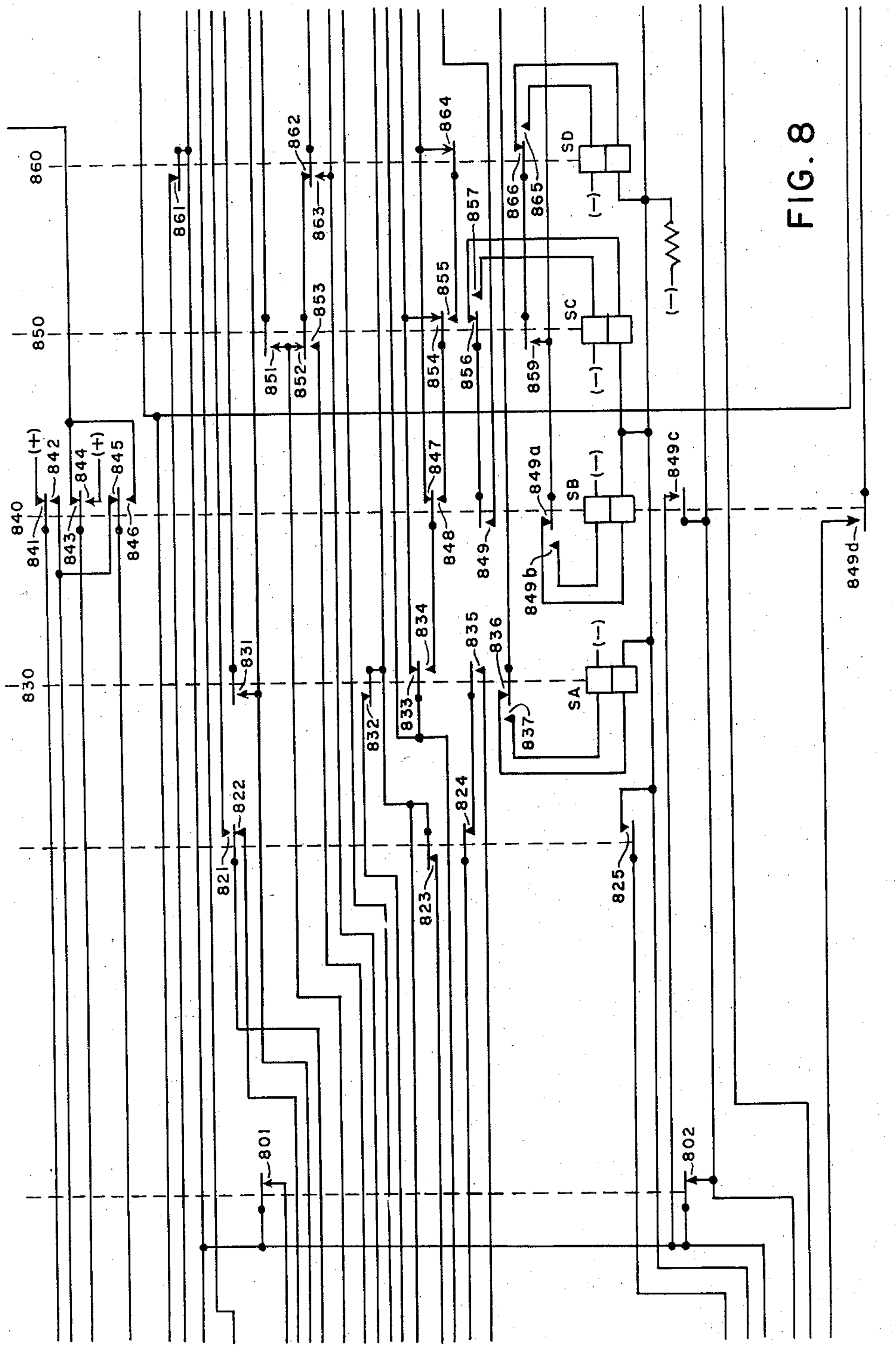

Referring to the system of the types specifically shown in the block diagram of Fig. 1, and assuming that a connection is to be extended from the wire chief's position to a line to be tested from the wire chief's apparatus, seizing means such as a key K20 in the wire chief's position is operated in order to initiate the seizure of the test selector. The operation of key K20 is effective for completing an operating circuit for hunt sleeve relay 340 in the test selector. The operating circuit is traced as follows: from ground through the upper winding of the relay 340, break contacts 301, conductor T, make contacts K201, transmitter T of the wire chief's telephone 20, dial break contacts D201, make contacts K202, conductor R, break contacts 313, and the lower winding of relay 320 to battery. Relay 340 thereupon operates.

The operation of relay 340 is effective for closing operating circuit for calling bridge relay 320 that is traced from ground, through the upper winding of relay 320, break contacts 311, make contacts 342 and 341, conductor T, make contacts K201, tranmitter T, break contacts D201, make contacts K202, conductor R, break contacts 313, and the lower winding of relay 320 to battery. Thereupon relay 320 operates. The current flowing in the above traced operated circuit of relay 320 is effective for energizing transmitter T.

The operation of relay 320 is effective for bringing about the seizure of the test selector shown in Figs. 3–10 by operating release delay relay 510. To this end, operation of relay 320 is effective for completing an operating circuit for relay 510 which is traced from ground through make contacts 321 and the winding of relay 510 to battery. The application of ground through make contacts 321 to conductor BL is also effective for energizing busy lamp LP20 over an obvious circuit. The operation of relay 320 is also effective for preparing an energizing circuit for operating the magnets of succeeding switches at make contacts 421.

The operation of relay 510 is effective for locking relay 340 in its operated position from ground through make contacts 611 and 445 and the lower winding of relay 340 to battery. Relay 340 thereafter remains operated so long as relay 510 is held in its operated condition. The operation of relay 510 is also effective for operating secondary delay relay 530. The latter operating circuit is traced as follows: from ground through make contacts 611, secondary off-normal break contacts SON101, wiring A1, and the lower winding of relay 530 to battery. Relay 530 thereupon operates. A similar operating circuit for primary delay relay 1040 is also completed at this time. The latter circuit is traced from ground through make contacts 611, primary off-normal contacts PON101, and the upper winding of relay 1040 to battery. Relay 1040 thereupon operates. The operation of relay 510 is also effective for closing an obvious operating circuit for release delay repeater relay 400 at make contacts 611.

The operation of relay 400 is effective for opening the above-traced operating circuit (including the upper winding) of relay 340 at break contacts 301, and for applying ground to the start conductor of the interrupter circuit INT which is common to the telephone exchange apparatus at make contacts 401. Thereafter the interrupter is effective for placing busy tone on conductor C902 by means not shown and for producing thirty impulse per minute ground signals which are transmitted to the selector over conductor 30IPM in Fig. 4.

Returning to the consideration of now operated relays 530 and 1040, the operation of relays 530 and 1040 is effective for preparing operating circuits for the means for advancing the main wiper set of the switch associated with the test selector. The advancing means include primary magnet PM101 and secondary magnet SM101. The operation of relays 530 and 1040 is also effective for preparing holding circuits for those relays at make contacts 532 and 1043, respectively. The operation of relay 1040 is effective for completing an operating circuit for primary delay repeater relay 1050 from ground through make contacts 611 and 1042 and the winding of relay 1050 to battery. The effect of the operation of relay 1050 is to be explained presently.

Figure 2B:
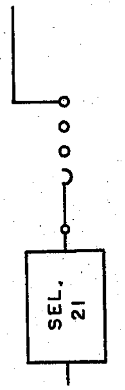

While the description thus far has been confined to the extension of a connection from the wire chief's test position to the selector, it is to be understood that connections may be extended to the test selector from an ordinary exchange selector such as 21 shown in Figs. 1 and 2B. The selector 21 functions in a manner well understood by those skilled in the art. Because the extension of the latter type of connections does not bear directly on my invention, the process of establishing them is not described in detail here.

*Operation of the test selector in its primary direction*

Figure 9:
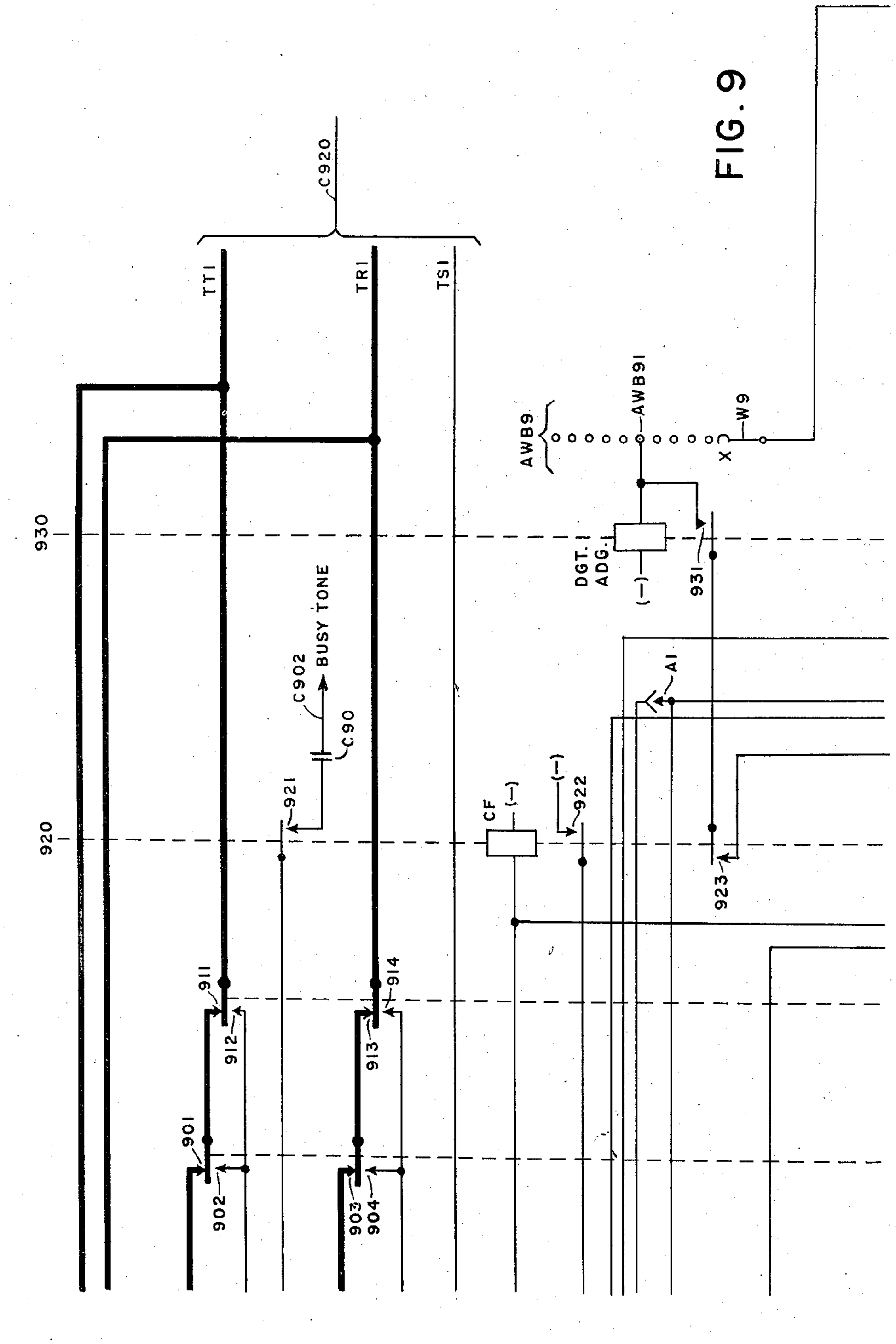
Figure 10:
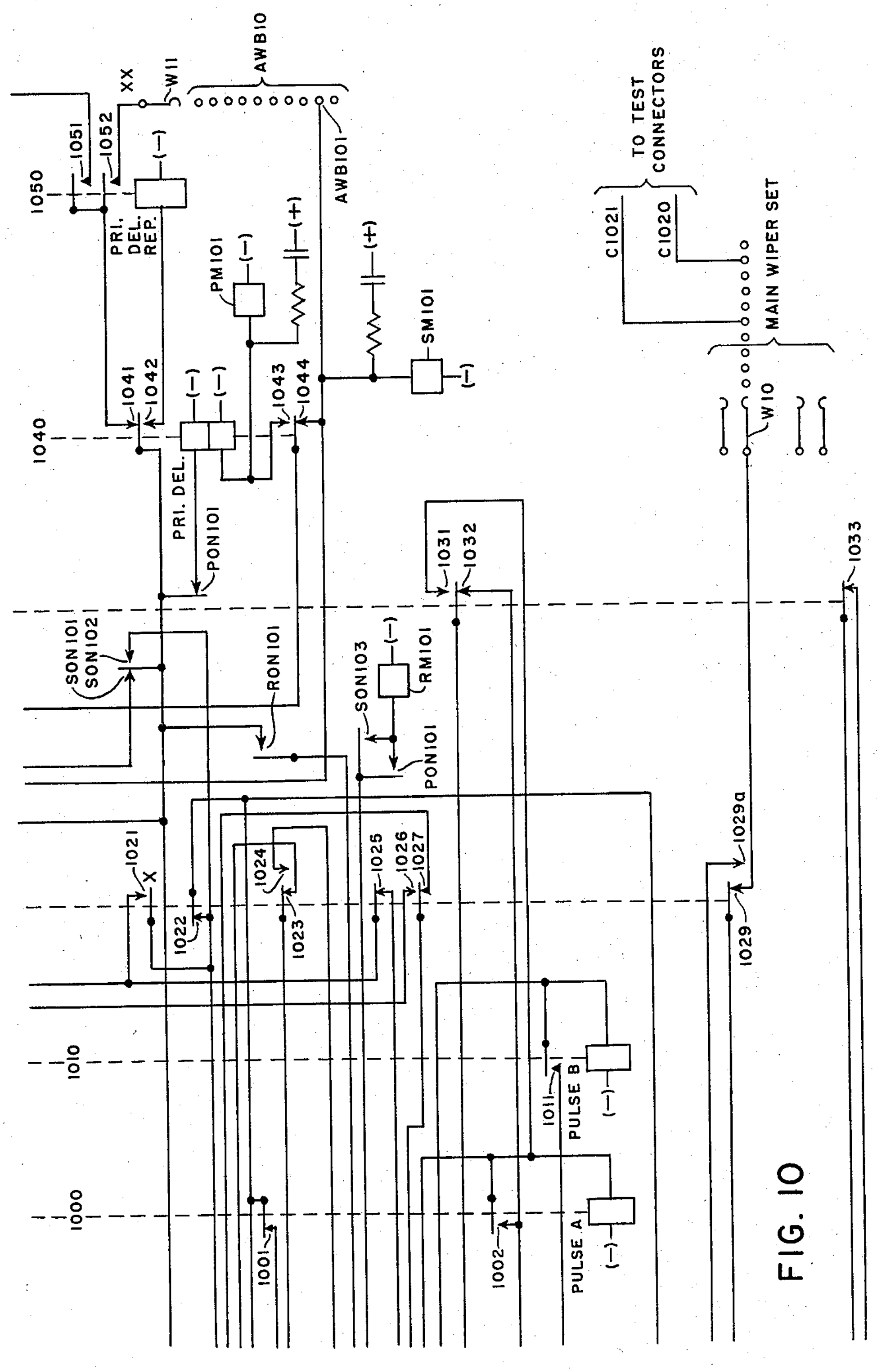

In order to establish a connection between the wire chief's test apparatus such as equipment 21A and a line to be tested such as B, dial D20 in the wire chief's position is operated a number of times in order to transmit a sequence of signals or digit impulses corresponding to the directory number of the line to be tested. Each signal comprises a series of one or more interruptions in the previously traced operating circuit of relay 320. These interruptions are caused by corresponding series openings and reclosings of break contacts 201. For the present, it is assumed that the directory number of each line to which test connections may be extended has four digits, and further that the test selector switch shown in Figs. 3–10 is directively operated in response to the transmission of a first train of digit impulses. To achieve the last mentioned response, the optional A1 wiring shown in Fig. 9 is included in the next described embodiment of my invention.

Relay 320 functions in response to the transmission of trains of digit impulses from dial D20 as a means for repeating digit impulses, first, to the test selector, and thereafter to a test connector selected by the operation of the test selector. Relay 510, being a slow release type, is maintained in its operated condition throughout the pulsing operation of relay 320 even though its operating circuit is momentarily interrupted by the opening of make contacts 321 for the interval that relay 320 is released in the course of each impulse received at the test selector.

In response to each release of relay 320 during the transmission of the first train of digit impulses, a circuit for energizing the means for advancing the main wiper set including wiper W10 of the switch in the test selector in primary direction is completed from ground through break contacts 322, make contacts 511, break contacts 525, make contacts 532 and 1043, and primary magnet PM101 to battery. An obvious circuit for intermittently energizing the lower winding of relay 1040 in parallel with magnet PM101 is also completed. Each energization of magnet PM101 is effective for moving the main wiper set one step in its primary direction away from the normal position and to a position opposite successive levels or banks of terminal sets on which the succeeding test connectors are terminated.

Upon the first energization of magnet PM101 and the resulting advance of the main wiper set away from its normal position, means including primary off-normal contacts associated with the test selector switch are operated. Thus, primary off-normal break contacts PON101 are opened to open the above traced operating circuit (including the upper winding) of relay 1040. Owing to its slow release nature, relay 1040 is thereafter maintained in its operated position throughout the transmission of the first train of impulses by the above-described intermittent energization of its lower winding. At the conclusion of the first series of digit impulses transmitted from the wire chief's position, relay 320 comes to rest in its operated position, so that the above traced holding circuit for relay 1040 is opened at break contacts 322. Relay 1040 thereafter releases.

At this point, the test selector has selected one of the levels of terminal sets to which it has access in that the main wiper set including wiper W10 now has been advanced directively to a point opposite one of the plurality of levels, so that the main wiper set may be advanced thereafter by movement in a secondary direction into engagement with one of the terminal sets within the selected level. The manner in which the secondary movement is accomplished depends upon the requirements of the test connector terminated at the selected one of the terminal sets. These requirements are discussed in the following paragraphs.

*Operation of the test selector in its secondary direction*

Referring to the telephone system shown in Fig. 1, a first class of switch trains including selector 22 and connector 24 has access to subscriber lines such as line A, and are terminated on a terminal-per-line basis in the multiple to which connector 24 and test connector 26 have access. The system also includes a second class of switch trains including selector 23 and connector 25 having access to subscriber lines such as line B which are terminated on a terminal-per-station basis in the multiple to which connector 25 and test connector 27 have access. In order to maintain uniform directory numbering within the system, i. e., arrange the switching equipment so that each subscriber station number includes the same number of digits regardless of its class, it is necessary to provide means within the second class of switch trains for absorbing certain intermediate digits which are not used to direct the switch train. If the directory number of each subscriber line in the system shown in Fig. 1 has four digits, a conventional terminal-per-station class of switch train would be arranged so that selector 23 is operative in response to one of the digits of the directory number for the purpose of selecting a connector, such as 25; and connector 25 is thereafter responsive to the two final digits of the directory number for selecting a terminal set of the required line suitable for signaling the required party connected to that line. In such a switch train the remaining unused digit would be absorbed within either the selector or the connector. In the case of connections extended over a conventional terminal per line class of switch trains, a selector, such as 22, is operative in response to the first digit of the called station directory number for selecting a connector such as 24, and a connector 24 thereafter responds to the transmission of a second and third directory number digits in order to select the terminal set on which the required lines such as A is terminated. In such switch trains, the connector would thereafter operate in response to the transmission of the fourth directory number digit to operate means for selecting the type of ringing signal suited to signaling the required party on the called line.

Thus it is apparent that in order to preserve the uniform numbering system in the course of extending test connections through the selector shown in Figs. 3–10 to terminal-per-line type lines, such as A, where the succeeding test selector, such as 26, operates in response to the two intermediate digits, the test selector shown in Figs. 3–10 must select the required test connector in response to the transmission of a first directory number. Thereafter, the transmission of the second and third directory digit must be effective to direct the test connector 26 into engagement with the required terminal of the subscriber line. The final (ringing selecting) digit serves no useful purpose within the test switch train and must therefore be absorbed.

In the case of test connections extended to terminal-per-station type lines, such as B, the test selector must absorb or use one of the first two digits of the called subscriber line directory number in the process of selecting the required test connector, such as 27. Following the selection of connector 27, the transmission of the final directory number digits is effective for selectively advancing test connector 27 to the terminal of the required line B.

Accordingly, only test connectors such as 27 having access to terminal-per-station type lines are terminated on sets of terminals within certain levels accessible from the main wiper set of the test selector shown in Figs. 3–10. To reach one of the latter levels in which a particular terminal set is located, the main wiper of the selector is advanced in the previously described manner in response to the first transmitted digit. Thereafter the main wiper set is directively advanced within the selected level in a secondary direction into engagement with the required terminal set in response to the next transmitted directory number digit. In the case of test connectors having access to terminal-per-line type lines only, only one such connector is terminated in each level to which the main wiper set of the test selector has access. In order to reach a particular test connector of the terminal-per-line class, the test selector main wiper set is advanced in the above-described manner in its primary direction to the level in which the appropriate test connector is terminated. Thereafter the main wiper set is automatically advanced in its secondary direction within the selected level until the terminal set on which the desired test connector terminates is reached. These two processes of selection are next described in detail.

*Terminal-per-station type operation.*—Upon the selection of a level in which terminal-per-station type test connectors, such as 27, are terminated and upon the release of primary delay relay 1040 in the previously described manner, a circuit is prepared for energizing appropriate level marking means within the test selector switch. The level marking means include auxiliary wipers W9 and W11 which are effective for engaging auxiliary wiper banks AWB9 and AWB10, respectively. As the selector switch is advanced in its primary direction, wipers W9 and W11 are advanced to the ones of the terminals in the auxiliary banks corresponding to the selected level. Levels used for access to terminal-per-station type test connectors are characterized by their connection to the winding of digit adding relay 930. It will be recalled that upon the selection of a level, relay 1040 is released. The release of relay 1040 is effective to open the above-traced operating circuit for relay 1050 at make contacts 1042. However, relay 1050 remains in operated condition for a time sufficient to allow relay 930 to operate over the above-traced circuit. Thus, upon the release of relay 1040 and during the time that slow release type relay 1050 is still in its operated condition, an operating circuit for relay 930 is completed from ground through make contacts 611, break contacts 1041, make contacts 1051, wiper W9, contact AWB91, and the winding of relay 930 to battery. Relay 930 thereupon operates to complete for itself the locking circuit from ground through make contacts 611, break contacts 923, make contacts 931, and the winding of relay 930 to battery. Following the operation of relay 930, relay 1050 releases.

With secondary delay relay 530 in operated condition and primary delay relay in its released condition, the next repeating operation of relay 320 (in response to the transmission of the second directory number digit) is effective for completing the operating circuit for means comprising secondary magnet SM101 for advancing the main wiper set within the selected one of the levels to the terminal set on which the desired test connector is terminated. Thus upon each release of relay 320, a circuit is completed from ground through break contacts 322, make contacts 511, break contacts 525, make contacts 532, break contacts 1044, and the winding of magnet SM101 to battery.

Upon the first step of the main wiper set within the selected level, secondary off-normal means including break contacts SON101 are operated in order to open the above-traced energizing circuit for the lower winding of relay 530. Thereafter, relay 530 is maintained in its operated condition throughout the second repeating operation of relay 320 because the upper winding of relay 530 is intermittently energized in parallel with the winding of magnet SM101. Therefore, relay 530 is maintained in its operated position until the second repeating operation of relay 320 is completed. Thereafter, relay 530 releases. At this point the main wiper set has been advanced within the selected level in its secondary direction to the point where wiper W10 engages the corresponding one of the terminal set on which a test connector such as 27 is terminated. The test connector is thereafter in condition to receive the next transmitted impulses from the wire chief's test set and operates in a manner to be described presently.

*Terminal-per-line type operation.*—Levels of the selector switch which are reserved for a single terminal-per-line type test connector are characterized by the connection of the winding of secondary magnet SM101 to the corresponding terminal of the auxiliary wiper banks AWB10 to the winding of secondary magnet SM101. Following the primary direction advance of the main wiper set to such a level, and upon the release of relay 1040 at the conclusion of the primary advance as described previously, a circuit is completed for energizing the magnet SM101 during the time that relay 1050 is in its operated condition. The circuit is traced from ground through make contacts 611, break contacts 1041, make contacts 1052, wiper W11, terminal AWB101, and the winding of magnet SM101 to battery. The release of relay 1050 which takes place in the previously described manner opens the circuit of magnet SM101 (including wiper W11) at make contacts 1052.

The above-described single energization of magnet SM101 is effective in the previously described manner to advance the main wiper set of the selector switch into engagement with the first terminal set within the selected level. In the system including the preferred embodiment of my invention, the single terminal-per-line type test connector within the level is terminated on this first terminal set. However, it will be apparent to those skilled in the art that well understood hunting controlling means suitable for use in selector switches might be supplied in order to cause the main wiper set to be advanced over a number of terminal sets to an intermediate or last terminal set on which the test selector could be terminated. As in the case discussed in connection with the selection of a terminal-per-station type test connector, the energization of magnet SM101 also energizes the upper winding of release delay relay 530, so that the operation of secondary off-normal springs 101 and the resultant opening of the lower winding energizing circuit of relay 530 does not cause the release of relay 530 until after the main wiper set of the selector has been advanced into engagement with the terminal set on which the test connector 27 is terminated.

*Transmission of impulses to a test connector*

Following the selection of a set of terminals by the main wiper set, the operation of the secondary off-normal means including make contacts SON102 is effective for preparing means comprising relays 830, 840, 850 and 860 used to register the number of trains of digit impulses subsequently repeated by relay 320 for operation by extending ground to one of the lower winding terminals of each of the relays. The circuit is traced from ground through make contacts 611 and SON102, break contacts 1022 to the terminals of the lower windings of the registering relays. The operation of the registering means is to be explained presently.

In response to the transmission of digit impulses to the selector after the main wiper set has been advanced to the terminal set on which the required test connector is terminated, relay 320 again repeats the impulses, this time to the selected test connector. The circuit for transmitting the impulses to the test connector is traced from ground through impulsing contacts 421, break contacts 635 and 1029, wiper W10, and the conductor extending to the test connector, such as C1021 or C1020.

Upon each release of relay 320 during the process of repeating any such train of impulses and in response to the release of relay 530, a circuit is completed for operating delay A relay 560. The circuit for operating relay 560 is traced from ground through break contacts 322, make contacts 511, break contacts 525 and 531, and the winding of relay 560 to battery. Relay 560, being a slow release type, is held operated throughout the transmission of each impulse train.

The operation of relay 560 is effective for closing an obvious operating circuit for relay 700 at make contacts 562. The operation of relay 700 closes an operating circuit for relay 710 at make contacts 701. The operation of relay 710 closes an operating circuit for the upper winding of relay 720 at make contacts 711. At the end of the impulse train transmitted to the test selector, relay 320 comes to rest in its operated condition, thereby opening the above-traced operating circuit of relay 560 at break contacts 322. Relay 560 releases. Upon the release of relay 560 it is apparent that relays 700, 710 and 720 release in the order named.

The first operation of relay 560 following the operation of the secondary off-normal means (i. e., upon the transmission of the first train of digit impulses to the succeeding test connector) is effective for completing an operating circuit for pulse A relay 1000. The circuit is traced from ground through make contacts 611, SON102, and 661, break contacts 1027 and 833, and the winding of relay 1000 to battery. Relay 1000 thereupon operates.

At the conclusion of the transmission of the first signal to the succeeding test connector, relay 560 releases in the above-described manner to open the above-traced operating circuit for relay 1000 at make contacts 661. A holding circuit for relay 1000 and an operating circuit for relay 830 is established upon removal of the direct ground from the right-hand terminal of relay 1000. The latter circuit is traced from battery through the winding of relay 1000, make contacts 1002, break contacts 836, and the lower winding of relay 830 to battery and the previously described ground connection to the lower right-hand winding terminal of relay 830. Current flowing in the holding circuit is sufficient to operate relay 830 to the point where make contacts 837 close. The closing of contacts 837 completes an operating circuit which is effective for fully operating relay 830 from battery through the upper winding of relay 830, make contacts 837, and the lower winding of relay 830 to the previously described ground connection extended to the lower right-hand winding terminal of relay 830.

The resulting full operation of relay 830 is effective for opening the above-traced holding circuit for relay 1000 at break contacts 836. Relay 1000 thereupon releases. The operation of relay 830 is also effective for transferring the above-traced energizing circuit including make contacts 661 from its connection to the winding of relay 1000 to the winding of the pulse B relay 1010 at break contacts 833 and make contacts 834, respectively.

Upon the transmission of a second train of digit impulses to the succeeding test connector, relay 560 reoperates in the above-described manner. The operation of relay 560 is effective in response to the operation of relay 830 for completing an operating circuit for pulse B relay 1010. The circuit is traced from ground through make contacts 611, SON102 and 661, break contacts 1027, make contacts 834, break contacts 847, and the winding of relay 1010 to battery. Relay 1010 thereupon operates.

At the conclusion of the transmission of the second impulse train to the succeeding test connector 26, the test connector wipers have been advanced to the terminal set of the line to be tested and relay 560 releases in the above-described manner to open the above-traced operating circuit for relay 1010 at make contacts 661. A holding circuit for relay 1010 and an operating circuit for relay 830 is established upon the removal of the direct ground from the right-hand terminal of the winding of relay 1010. The latter circuit is traced from battery through the winding of relay 1010, make contacts 1011, break contacts **849*a*, and the lower winding of relay 840 to the previously described ground connection to the lower right-hand winding terminal of relay 840. Current flowing in the holding circuit is sufficient to operate relay 840 to the point where make contacts 849*b* close. The closing of contacts 849*b* completes an operating circuit which is effective for fully operating relay 840 and which is traced from battery through the upper winding of relay 840, make contacts 849*b*, and the lower winding of relay 840 to the previously described ground connection extended to the lower right-hand winding terminal of relay 840**.

The resulting operation of relay 840 is effective for opening the above-traced holding circuit for relay 1000 at break contacts **849*a*. Relay 1010 thereupon releases. The operation of relay 840 is also effective for transferring the above-traced energizing circuit including contacts 661 from its above-traced connection to the winding of relay 1010 to the winding of relay 1000 at break contacts 847 and make contacts 848**, respectively.

In the case of connections extended to terminal-per-station type connectors such as 25, the need to transmit further trains of digit impulses to the succeeding connector stops at this point. At this point the wipers of the test connector 25 have been advanced to engage the required line terminal set, so that the test selector shown in Figs. 3–10 may be made to conduct a series of routine tests at this point. The latter process is to be described presently.

*Transmission impulses to a terminal-per-line type test connector.*—Up to this point the registration of the number of trains of digit impulses transmitted to the succeeding test connector within the means comprising relays 830, 840, 850 and 860 has been identical for the cases of connections extended to either terminal-per-station or terminal-per-line type test connectors because the first and second digits repeated by the test selector must be transmitted to the succeeding test connector regardless of its class. Thereafter, the necessity for registering succeeding signals within the registering relays depends upon the class of the connector over which the test connection is being extended. In the case of terminal-per-line type connectors, it will be recalled that in the system forming the preferred embodiment of my invention it is necessary to transmit to test connector 26 the next two of the three remaining digit impulses of the tested line directory number after a connection has been extended from the test selector to the required terminal-per-line type test connector 26. It is also to be recalled that the final digit of the terminal-per-line directory number is not to be transmitted to the test connector. The registration of the third number and the method for making the repeating means ineffective is next described.

The transmission of a third train of impulses to the succeeding connector circuit is effective for reoperating relay 560 in the above-described manner. Relay 1000 thereupon operates over the following circuit: from ground through make contacts 611, SON102 and 661, break contacts 1027, make contacts 834 and 848, break contacts 854, and the winding of relay 1000 to battery. Relay 560 thereafter releases in the above-described manner to open the above-described operating circuit for relay 1000 at make contacts 661. The removal of direct ground from the right-hand terminal of relay 1000 is effective for completing an operating circuit for SC relay 850 from battery in the manner explained next.

In the case of connections extended to terminal sets in those levels to which the main wiper set of the test selector has access and which are used for terminating terminal-per-line type test connectors, it is to be recalled that relay 920 is maintained in its released condition. Thus, at the conclusion of the registration of the third train of digit impulses transmitted to the succeeding test connector 26, a circuit is completed for operating SC relay 850 from battery through the winding of relay 1000, make contacts 1002, break contacts 1042, make contacts 849, break contacts 856, and the lower winding of relay 850 to the previously described ground connection. Relay 850 thereupon operates to the point where make contacts 857 close. The closing of contacts 857 completes a circuit for fully operating relay 850 from battery through the upper winding of relay 850, make contacts 857, and the lower winding of relay 850 to the previously described ground connection. The full operation of relay 850 opens the holding circuit for relay 1000 at break contacts 856. Relay 1000 then releases.

Returning to that point in the description where relay 840 operated at the conclusion of the transmission of the second digit impulse train to connector 26, shorting means is made effective in response to the operation of registering relay 840 for rendering the repeating means comprising the impulsing contacts 421 on relay 320 ineffective. To accomplish this, a circuit for shorting out make contacts 421 is completed from ground through make contacts 611, break contacts 1033 and make contacts **849*d* to the upper side of make contacts 421. The completion of the shorting circuit prevents the subsequent impulsing operation of make contacts 421 from repeating impulse trains over the previously traced impulsing circuit including break contacts 635. Thus, upon the transmission of the final directory digit number from the wire chief position to the test selector the only effect of the impulsing operation of relay 320 is to reoperate relay 560 with the previously noted effect of operating relay 850**.

*Transmission of impulses to a terminal-per-station type test connector.*—It is to be recalled that upon the selection of a terminal set in one of the levels reserved for terminating terminal-per-station type test connectors, it is thereafter necessary to transmit only the last two trains of digit impulses representing the final digits in the tested line directory number to the selected test connector in order to advance the wiper set of the succeeding test connector, such as 27, into engagement with the terminal set of the line to be tested. Upon the transmission of such impulse trains, relays 830 and 840 are operated in the above-described manner. It is also to be recalled that upon the selection of any one of the levels reserved for terminating terminal-per-station type test connectors, relay 940 operated. Thus, upon the registration of the final digits, it is necessary for reasons to be explained presently to operate relay 850. To this end, an operating circuit is completed in response to the operation of relays 840 and 940 for operating relay 850. The circuit for operating relay 850 is traced from battery through the winding of relay 1000, make contacts 1031 and 849, break contacts 856, and the lower winding of relay 850 to the previously described ground connection. As in the previous description, relay 850 thereupon operates to the point where make contacts 857 close in order to complete the previously described circuit including make contacts 857 for operating relay 850 fully.

As in the case of the previously described operation of the test connector 26, the operation of relay 850 is effective to prepare the test selector for cut-through operation. The cut-through operation is next described.

*Cut-through operation*

Upon the registration of the last signal to be transmitted to the test selector as indicated by the operation of relay 850 which may take place in either of the previously described manners, testing apparatus within the selector is prepared for connection to conductors TT1 and TR1. Conductors TT1 and TR1, shown collectively as conductors C920, extend from the test selector to certain ones of the wipers associated with all test connectors in the system. Thus conductors TT1 and TR1 are extended to the line under test through the wipers of the one of the test connectors which has been operated in response to the transmission of directive signals in the previously described manner.

The aforementioned preparing process is started by the operation of relay 850 which is effective for completing an operating circuit for toll relay 620. The operating circuit is traced from ground through make contacts 611 and SON102, break contacts 801 and 601, make contacts 821 on still operated relay 720, break contacts 1023, make contacts 851, break contacts 434, and the lower winding of relay 620 to battery. Relay 620 thereupon operates and closes for itself a locking circuit from ground through make contacts 611 and SON102, break contacts 861, make contacts 621, break contacts 432 and 434, and the lower winding of relay 620 to battery. Relay 620 operates.

The operation of relay 620 is effective for completing an operating circuit for CF relay 920. The operating circuit of relay 920 is traced from ground through make contacts 611 and SON102, break contacts 861 and 411 in parallel, make contacts 621 and 624, break contacts 1025, and the winding of relay 920 to battery. The operation of relay 920 is effective for closing a holding circuit for itself from battery through the winding of relay 920, make contacts 1021, SON102 and 611 to ground. The operation of relay 920 is effective for opening the previously traced ground connection to the lower winding terminals of relays 830, 840, 850 and 860 at break contacts 1022. Any operated ones of relays 830, 840, 850 and 860 thereupon release. The operation of relay 920 is further effective for opening the operate circuit for digit adding relay 930 at break contacts 923. If relay 930 has been operated, it is released at this time.

*Access to subscriber lines having five-digit designations*

The selector forming the preferred embodiment of my invention may be adapted for use in extending test connections to subscriber lines in a system having a uniform five-digit numbering system where the first digit of all directory numbers transmitted into the selector are to be absorbed. In order to adapt the selector being considered here for such service, the A1 wiring option in Fig. 9 is omitted. Thus, upon the seizure of the test selector from preceding equipment, such as the wire chief position, relays 310, 510, 400 and 1040 are operated in the previously described manner. However, the previously traced operating circuit for secondary delay relay 530 is open owing to the omission of the A1 wiring option and so is not operated at this time.

Assuming that the first digit of all subscriber line directory numbers is to be absorbed, upon the transmission of such signals to the test selector the released condition of relay 530 is effective for holding open the operating circuits of magnets PM101 and SM101 at make contacts 532. Thus, neither magnet is energized during the transmission of the first train of digit impulses to the selector, and consequently the main wiper set of the selector switch is not advanced at this time. Instead, impulsing operation of relay 320 is effective in response to the transmission of the first train of digit impulses for completing the previously described operating circuit of delay relay 560. It is to be recalled that the latter circuit included break contacts 531 of relay 530. The operation of relay 560 brings about in the previously described manner the operation of relays 700, 710 and 720. At the conclusion of the transmission of the first train of digit impulses, relays 560, 700 and 710 release in the order named. During the time that the latter relays are released and relay 720 is still in its operated condition, a circuit is completed for maintaining relay 720 operated which is traced from ground through make contacts 611, break contacts SON101, make contacts 725, break contacts 702, make contacts 724, and the lower winding of relay 720 to battery.

The operation of relay 720 and the release of relay 700 is effective for completing an operating circuit for relay 530. The latter circuit is traced from ground through make contacts 611, break contacts SON101, make contacts 725, break contacts 702 and 731, and the lower winding of relay 530 to battery. Relay 530 thereupon operates.

The operation of relay 530 is effective in the previously described manner to make the selector switch responsive to subsequently transmitted digit impulse trains. The selector switch is thereby operated to seize a required one of the test connectors. It is to be noted that the above-traced locking circuit for relay 720 including the lower winding of relay 720 is maintained energized until the selector switch has been advanced in its secondary direction and the secondary off-normal break contacts SON101 have been opened. Relay 720 is then released.

*Testing of line to which a connection has been extended*

The description thus far has been concerned only with the manner in which a connection is extended from an originating point through the test selector and test connectors to the termination of a line to be tested. Subsequent to the extension of the wipers of the test connector to the terminals of the called line and to the above-described cut-through operation of the test selector, means within the selector is effective for conducting a series of tests including tests for foreign E. M. F. on either conductor of the line and leakage resistance between the conductors of the line and each conductor of the line and ground. Because this operation of the test selector is not a part of the present invention, the description is given in more general terms than the foregoing description.

*Busy test.*—Following the extension of a connection from the test selectors to the wipers of the test connectors over conductors TT1, TR1 and TS1, shown compositely as conductors C901, the test selector is in condition to determine whether or not the line to be tested is in busy condition. Such a busy condition is indicated by the presence of ground on the multiple conductor of the line under test which is connected to conductor TS1 by the corresponding wiper of the test connector. Thus busy test relay 330 remains in its unoperated condition if the called line is in idle condition and is operated if the called line is in busy condition. The operation of relay 330 is effective to prevent the automatic testing means within the test selector from operating and for returning busy tone to the calling point such as the wire chief's test position.

*Operation following a negative busy test operation.*—Assuming that the line under test is in idle condition, relay 330 fails to operate and the equipment within the test selector goes through the next described cycle. It is to be recalled that both relays 620 and 920 are operated. Thereafter, transfer relay 650 operates in order to prepare the operating circuit of reverse relay 410.

*Testing.*—Thereafter detecting means comprising the winding of line test relay 640 is placed in its operated condition through a selectable number of dropping resistances R60—R69. The number of resistances so selected are included in the operating circuit of relay 640 and is determined by the setting of the resistance selecting switch S60. Following the operation of relay 640, the operating circuit is opened and relay 640 is connected to the conductors of the line under test in a variety of manners. When relay 640 is held in its operated condition, the normal sequence of testing is interrupted at the point at which failure to release occurs, thereby indicating a fault.

The relays 830–860, inclusive, which were used in the previously described manner for registering the number of subscriber line directory digits transmitted to the test connector are reused for advancing the test apparatus through its cycle of operations, and for connecting the test apparatus to the conductors TT and TR. After the test selector has been placed in its testing condition, the next two ground impulses transmitted to the test selector over conductor 30IPM are effective for reoperating relay 530. The operation of relay 530 is effective at this time for completing an operating circuit for relay 640 and for relay 1000.

The resulting operation of relay 1000 is effective for applying ground to the lower winding terminals of relays 830–860 and for preventing the operation of relay 830 at this time. At the conclusion of the first signal transmitted over conductor 30IPM, relay 530 releases and allows relay 830 to operate. During the time that relay 1000 is operated and relay 530 released, the winding of relay 640 is connected between ground and both conductors of the line under test by way of conductors TT and TR. In the event that a potential exceeding a certain critical value which indicates a foreign E. M. F. is present on either or both conductors, current sufficient to hold relay 640 operated flows through the winding of relay 640. If relay 640 releases at this time, the test apparatus advances to its next step.

Upon the operation of relays 830 and 530, a circuit is closed for operating relay 1010. The operation of relay 1010 is effective for shorting out the winding of relay 840 in order to prevent relay 840 from operating at this time. The operation of relays 830, 530 and 650 is effective for causing the second signal transmitted over conductor 30IPM to operate relay 410. Relay 410 is thereafter maintained in its operated condition so long as the impulse is present on conductor 30IPM and is effective for passing back a single flashing signal to the operator supervisory lamp LP21.

The reoperation of relay 530 is effective in the previously described manner for operating relay 640. The resulting operation of relays 530, 640 and 830 is effective for opening the operating and holding circuits for relay 650 which thereupon releases. Upon the removal of the second ground impulse from conductor 30IPM, relay 530 releases opening the operating circuit for relay 1010 and for completing the previously described holding circuit for relay 1010 and the operating circuit for relay 840. The release of relay 530 is further effective for opening the operating circuit of relay 640 so that relay 640 is connected in series with the conductors of the line under test to determine the interconductor resistance.

Assuming that no foreign E. M. F. fault condition exists on the line under test, relay 640 is released, thereby bringing about the reoperation of relay 650. The next (third) appearance of a signal on conductor 30IPM is thereupon effective for further extending the ground signal transmitted over conductor 30IPM to the upper winding of relay 410. Relay 410 thereupon reoperates in order to cause a second flash of lamp LP21. The operation of relays 530 and 840 is effective for reoperating relay 1000. The reoperation of relay 1000 is effective for preventing the operation of relay 850 at this time. At the conclusion of the third signal transmitted over conductor 30IPM, relay 530 is again released in order to allow relay 850 to operate and relay 1000 to release. Relay 400 releases to de-energize lamp LP21. Following the release of relay 530 upon the removal of the impulse from conductor 30IPM during the time that relay 1000 is still operated, the winding of relay 640 is connected between battery and the conductors of the line under test. In the event that the resistance between the conductors of the line under test and ground is below the required standard, enough current flows through the winding of relay 640 to hold relay 640 in its operated condition and thereby indicate a fault.

Assuming that relay 640 releases, the application of the next impulse transmitted over conductor 650 releases and 640 operates. In response to the operation of relay 850, conductor TT1 and the conductor of the line under test to which conductor TT1 is connected is disconnected from wiper S61 and connected to ground. Thereafter, upon the removal of the ground signal from conductor 30IPM, relay 530 releases in order to connect the winding of relay 640 between battery and ground connected to the line under test through the leakage resistance of the line.

Prior to the release of relay 530, the presence of a signal on conductor 30IPM is effective for operating relay 410. The operation of relay 410 is effective in the previously described manner for operating lamp LP21. Upon the removal of the fourth impulse from conductor 30IPM, relay 410 releases.

*Release of the line under test*

Upon the completion of the above-described series of tests on a particular line, the test connector may be released. Because the apparatus involved in the release of the test connector does not form a part of my invention, the process is described here only in general terms.

In order to release the switch train, the operator at wire chief position restores key K20 to its normal condition thereby disconnecting telephone TEL20 from the previously described operating circuit of relay 320 at make contacts K201 and K202. The resulting release of calling bridge relay 320 is effective for restoring release delay relay 510 and consequently release delay repeater relay 400 to their normal conditions. The restoration of relays 400 and 510 is effective for restoring other operated relays and for completing an operating circuit for the release means comprising magnet RM101. Magnet RM101 is operated over the following circuit: from battery through winding RM101, either or both the operated make contacts SON102 and PON102, and break contacts 613 to ground. The operation of magnet RM101 is effective for restoring the main and auxiliary wiper sets to normal position, thereby opening the above-traced circuit from ground through conductors C1020 or C1021 to the succeeding test connector. Removal of ground from conductors C1020 or C1021 is effective for causing means within the succeeding test connector to operate releasing means within itself in order to restore it to its normal condition.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system, a selector including a switch, said switch comprising a set of wipers having a normal position and a plurality of terminal sets arranged in levels for engagement by said wiper set, succeeding apparatus terminated on certain ones of said terminal sets, means for advancing said wiper set in a primary direction to select any one of said levels, means for advancing said wiper set in a secondary direction to select any one of said terminal sets within the selected one of said levels, means for seizing and thereafter transmitting trains of digit impulses to said selector, means for repeating trains of digit impulses transmitted to said selector, means for making said repeating means effective to operate said primary advancing means upon the transmission of a first impulse train to said selector, secondary actuating means for thereafter operating said secondary advancing means, said repeating means being thereafter effective for repeaitng subsequently transmitted impulse trains to said succeeding apparatus terminated on the selected one of said terminal sets, and means for counting a number of impulse trains transmitted by said repeating means to said succeeding equipment, said counting means being operative upon the registration of a predetermined number of impulse trains for rendering said repeating means ineffective.

2. In a telephone system, a selector including a switch, said switch comprising a set of wipers having a normal position and a plurality of terminal sets arranged in levels for engagement by said wiper set, succeeding apparatus terminated on certain ones of said terminal sets, means for advancing said wiper set in a primary direction to select any one of said levels, means for advancing said wiper set in a secondary direction to select any one of said terminal sets within the selected one of said levels, means for seizing and thereafter transmitting trains of digit impulses to said selector, means for repeating trains of digit impulses transmitted to said selector, means for making said repeating means effective to operate said primary advancing means upon the transmission of a first impulse train to said selector, secondary actuating means for thereafter operating said secondary advancing means, means operative in response to the selection of certain ones of said levels for automatically operating said secondary actuating means, means operative in response to the selection of certain other ones of said levels for rendering said repeating means operative to control said secondary actuating means, said repeating means being thereafter effective for repeating subsequently transmitted impulse trains to said succeeding apparatus terminated on the selected one of said terminal sets, and means for counting a number of impulse trains transmitted by said repeating means to said succeeding equipment, said counting means being operative upon the registration of a predetermined number of impulse trains to apparatus terminated in any one of said certain levels for rendering said repeating means ineffective.

3. In a telephone system, a selector including a switch, said switch comprising a set of wipers having a normal position and a plurality of terminal sets arranged in levels for engagement by said wiper set, succeeding apparatus terminated on certain ones of said terminal sets, means for advancing said wiper set in a primary direction to select any one of said levels, means for advancing said wiper set in a secondary direction to select any one of said terminal sets within the selected one of said levels, means for seizing and thereafter transmitting trains of digit impulses to said selector, means for repeating trains of digit impulses transmitted to said selector, means for making said repeating means effective to operate said primary advancing means upon the transmission of a first train of impulses to said selector, secondary actuating means for thereafter operating said secondary advancing means, secondary off-normal means effective in response to a secondary advance of said wiper set for causing said repeating means to repeat trains of impulses subsequently transmitted to said selector to said succeeding apparatus terminated on the selected one of said terminal sets, and means for counting the number of trains of impulses transmitted by said repeating means, said counting means being operative upon the registration of a predetermined number of trains of impulses for rendering said repeating means ineffective, said secondary off-normal means being also operative for rendering said counting means operative, whereby only a predetermined number of trains of digit impulses transmitted to said selector are repeated to said apparatus terminated on the selected one of said terminal sets.

4. The telephone system set forth in claim 3 and having in addition means operative in response to the primary advance of said wiper set to certain ones of said levels for automatically operating said secondary actuating means in order to cause said wiper set to engage one of said terminal sets in response to the transmission of one impulse train to said selector, and means operative in response to the primary advance of said wiper set to certain other of said levels for rendering said repeating means operative to directively control said secondary actuating means in order to cause said wiper set to engage one of said terminal sets in response to the subsequent transmission of first and second trains of digit impulses to said selector.

5. The system set forth in claim 3, having in addition means for testing, and wherein said counting means in condition to render said repeating means ineffective is also effective for rendering said testing means operative.

6. The system set forth in claim 3 and having in addition: means for testing, single digit means operative in response to the primary advance of said wiper set to certain ones of said levels for operating said secondary actuating means in order to cause said wiper set to engage one of said terminal sets in response to the transmission of one impulse train to said selector, and means operative in reponse to the primary advance of said wiper set to certain other of said levels for rendering said repeating means operative to directively control said secondary actuating means in order to cause said wiper set to engage one of said terminal sets in response to the transmission of first and second trains of digit impulses to said selector; and wherein said single digit means is operative in response to the operation of said counting means to register a number of operations of said repeating means less than the number of operations required to render said repeating means ineffective for placing said counting means in condition to render said testing means operative, whereby said testing means is made operative following the subsequent transmission of a first predetermined number of digit impulse trains to succeeding equipment terminated in said certain levels and a second predetermined number of digit impulse trains in the case of succeeding equipment terminated in said certain other levels.

References Cited in the file of this patent

UNITED STATES PATENTS

| | | |
|---|---|---|
| 2,670,406 | Elliott | Feb. 22, 1954 |
| 2,773,138 | Kessler | Dec. 4, 1956 |